United States Patent [19]

Podlewski

[11] 4,167,698

[45] Sep. 11, 1979

[54] MONITORING THE CONDUCTION CUTOFF PHASE ANGLES IN RECTIFIERS

[75] Inventor: Johann Podlewski, Berlin, Fed. Rep. of Germany

[73] Assignee: Licentia Patent-Verwaltungs-G.m.b.H., Frankfurt, Fed. Rep. of Germany

[21] Appl. No.: 908,826

[22] Filed: May 23, 1978

[30] Foreign Application Priority Data

May 28, 1977 [DE] Fed. Rep. of Germany ....... 2724796

[51] Int. Cl.² .................... G01R 31/22; H02M 7/12
[52] U.S. Cl. ........................ 324/158 SC; 324/83 A; 324/158 D; 363/87; 363/129
[58] Field of Search ........... 324/158 SC, 158 D, 189, 324/83 A; 363/85, 86, 87, 88, 118, 129

[56] References Cited

U.S. PATENT DOCUMENTS

| 3,413,544 | 11/1968 | Jotten et al. | 324/189 |
| 3,584,286 | 6/1971 | Randall | 363/129 |

FOREIGN PATENT DOCUMENTS 1263623  5/1971  Fed. Rep. of Germany .

*Primary Examiner*—Rudolph V. Rolinec
*Assistant Examiner*—Ernest F. Karlsen
*Attorney, Agent, or Firm*—Spencer & Kaye

[57] ABSTRACT

In order to monitor the conduction cutoff phase angles of a plurality of controllable rectifiers arranged in two groups in a rectifier bridge, a signal proportional to the angle for each rectifier is stored in a respective sample and hold member after each occurrence of a positive blocking voltage at that rectifier, and the minimum of the currently stored signals is observed.

3 Claims, 10 Drawing Figures

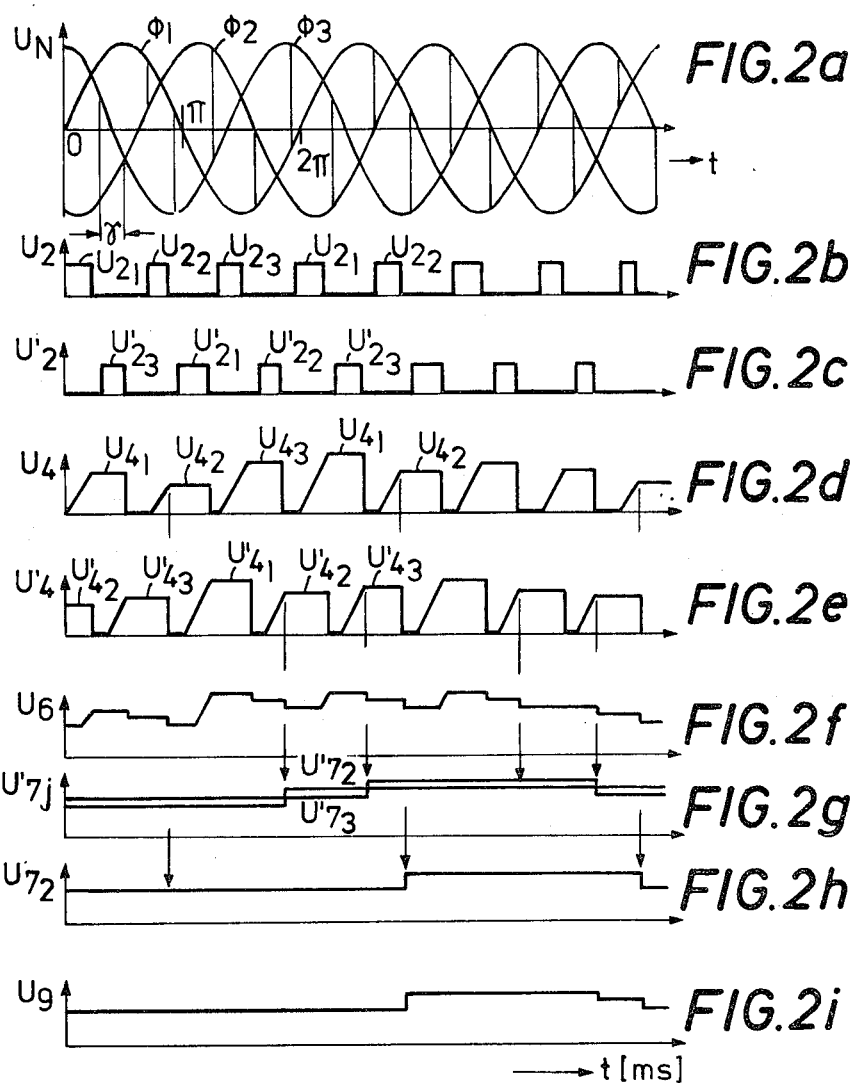

MONITORING THE CONDUCTION CUTOFF PHASE ANGLES IN RECTIFIERS

BACKGROUND OF THE INVENTION

The present invention relates to a method for controlling the conduction cutoff phase angles of p rectifier elements, or thyristors, of a thyristor bridge circuit by forming, in an integrator, for each commutation element group, a signal proportional to the amplitude of the conduction cutoff phase angle by integration of an auxilliary signal of constant amplitude.

Such a method is carried out with the aid of starting pulses derived from decay of the current in the individual rectifiers to zero and end pulses derived at the instant the blocking voltage for a respective rectifier becomes positioned. Integration is separately performed for each element, and the integration result associated with one element is erased by the end pulse associated with another commutation element group, the maximum value of the integrations being stored. The present invention also relates to an apparatus for practicing the method.

A method of the above-described type is disclosed in German Pat. No. 1,263,623, and counterpart U.S. Pat. No. 3,413,544 issued to Jotten et al. This method is used to measure the length of a plurality of successive periodic time intervals by forming a signal representing the average of the successive time intervals. These time intervals correspond to the current flow duration of the p rectifier elements.

If the multiphase, generally three-phase, mains to which a rectifier is connected have a high degree of asymmetry and the mains voltage contains many harmonics, there no longer exists a dependable cutoff angle control for the rectifier because use of an average value precludes rapid follow-up regulation, or adjustment of the regulation upon a reduction of the smallest cutoff phase angle occurs too late.

SUMMARY OF THE INVENTION

It is therefore an object of the present invention to overcome such drawback so that even with a mains voltage containing many harmonics or greater asymmetries, respectively, it should be possible to effect proper conduction cutoff phase angle regulation and thus assure dependable rectifier operation.

It is a more specific object of the invention to monitor the cutoff phase angles in such a manner as to attenuate large fluctuations in the phase angles of the individual rectifier elements.

Another object is to provide an apparatus for practicing the method.

These and other objects are achieved according to the present invention by feeding the maximum value integration signal to the inputs of a plurality of sample and hold members, controlling storage of signal values in each member by supplying thereto read-in pulses constituted by the end pulses associated with a respective rectifier element, and selecting the minimum signal value stored in all of the members.

Apparatus for performing a monitoring operation according to the invention includes a plurality of bistable stages each associated with a respective rectifier element and each connected to be set by a starting pulse for that element and to be reset by the following end pulse for that element, two integrators each connected to receive the resulting output pulses from a respective group of bistable stages and to produce an output voltage proportional to the duration of each such pulse, and a maximum value comparator connected to the outputs of the integrators and producing an output signal representative of the higher one of the output voltages presently being produced by the two integrators and constituting the maximum integration value signal.

The monitoring procedure according to the present invention produces a filter effect which significantly counteracts large cutoff angle fluctuations, and thus large regulating value fluctuations, between the rectifier elements, resulting in fault-free control of the regulating value even if the mains voltages contain many harmonics. This is so because a reduction in the smallest cutoff phase angle is considered at once and fed to the control circuit while an increase in the phase angle of all rectifier elements becomes effective only after a full mains phase cycle.

BRIEF DESCRIPTION OF THE DRAWINGS

FIGS. 2a to 2i show signal waveforms at various points in the circuit of FIG. 1.

DESCRIPTION OF THE PREFERRED EMBODIMENTS

Figure 1:
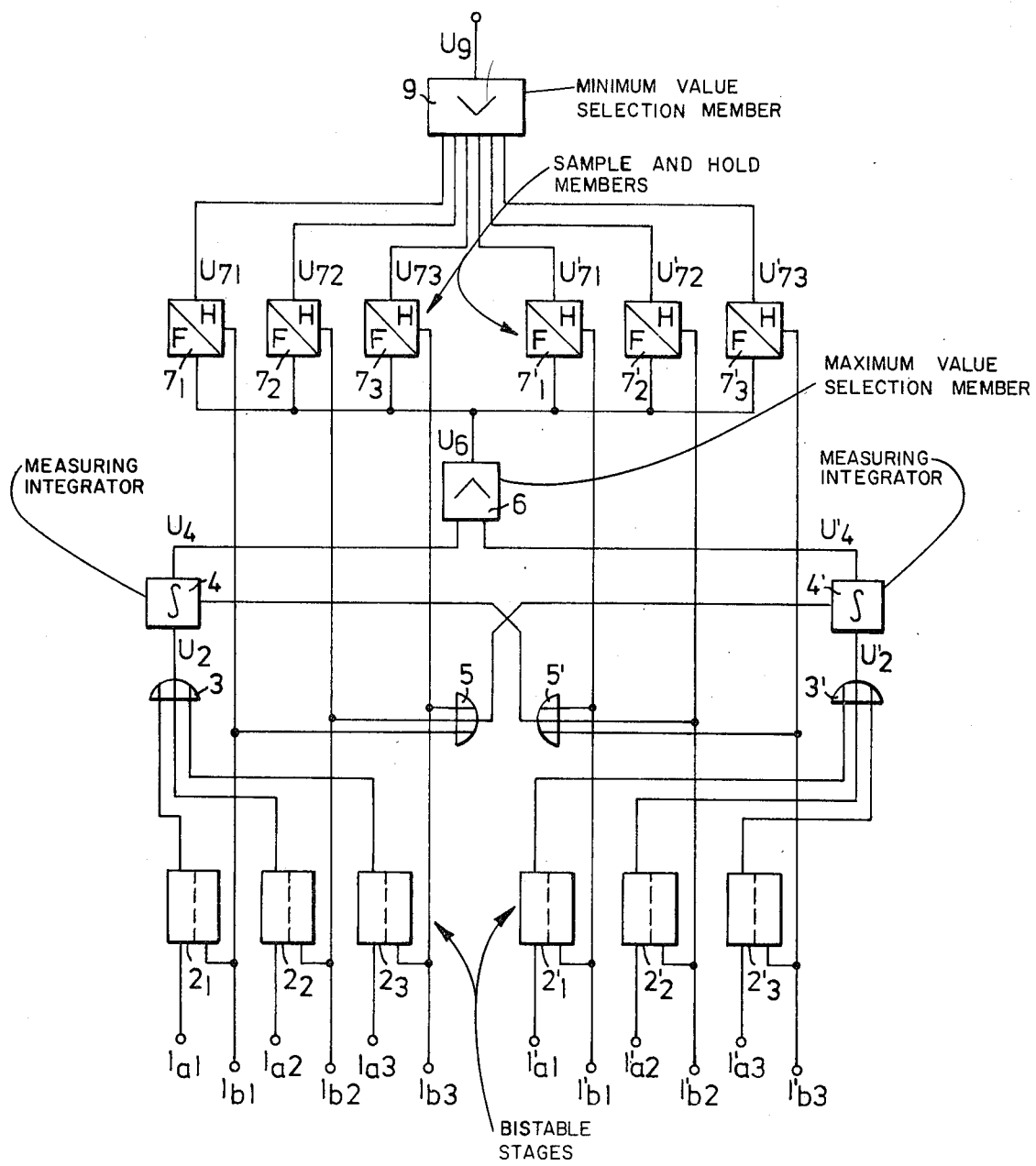
FIG. 1 is a block circuit diagram of a preferred embodiment of a measuring arrangement for practicing the method according to the invention in a thyristor rectifier in a three-phase bridge circuit.

FIG. 1 shows a circuit arrangement for two commutation groups, constituting positive and negative bridge halves, respectively, each group having an associated measuring integrator 4 or 4', respectively, which are regulated alternatingly. The input signals for integrator 4 are provided by bistable stages $2_1$, $2_2$ and $2_3$, while those for integrator 4' are provided by bistable stages $2'_1$, $2'_2$ and $2'_3$. Each cutoff angle, or each one of the rectifier elements, or thyristors, in this case there being six such elements, has such an associated bistable stage.

The input signals to each bistable stage 2 or 2' are the current and voltage signals from one element. Thus each input $1_a$ or $1'_a$ receives a respective current end pulse and each input $1_b$ or $1'_b$ receives a respective positive blocking voltage commencement pulse. The bistable stages are set by the current pulses and reset by the voltage pulses.

The distance between each associated current and voltage pulse corresponds to the conduction cutoff phase angle $\gamma$ to be measured for the respective element. FIG. 2a shows the three-phase mains voltages $\phi_1$, $\phi_2$ and $\phi_3$ fed to the rectifier bridge, as well as one phase angle $\gamma$. The instants at which subsequent starting pulses are produced are also shown, as vertical lines.

The starting pulses are formed from the negative voltage jump across the element at the end of current conduction, or directly from the element current, or from the bridge input current itself. The voltage, or end, pulses are derived from the zero passages of the mains or commutation voltage, respectively, across each element. Since a commutation voltage containing many harmonics obviously produces a plurality of zero passages, the determining bistable stages are provided with a hysteresis loop.

Bistable stages with a hysteresis loop are known from the book by Tietze/Schenk "Halbleiter-Schaltungstechnik", 2nd edition, Springer-Verlag, Berlin, 1971, p. 415.

The output signals from the bistable stages of each commutation group are combined in respective OR members 3 and 3'. At the outputs of these OR members there appear pulse sequences $U_2$ and $U'_2$ shown in FIGS. 2b and 2c. In each pulse sequence, the pulses have an average repetition period $T = 4\pi/n$ and a constant amplitude. The width of each pulse corresponds to a respective conduction cutoff angle. These pulse sequences are fed to the associated measuring integrators 4 and $4_1$, respectively. The input signals to the two measuring integrators are thus offset with respect to one another by $T = (-\pi + 4/3 \cdot \pi) = \pi/3$, when $n = 6$.

During each zero passage of the commutation voltage, at the end of one time interval, when, for example, the input signal of the measuring integrator 4 becomes zero, an integration phase is completed and a new reading is available. The information from the preceding measurement, which is still stored in the measuring integrator 4', has thus become superfluous and can be erased. Erase signals are provided by voltage pulses of the other commutation group. Thus, the voltage commencement pulses at inputs $1_{b1}$, $1_{b2}$ and $1_{b3}$ are connected via an OR gate 5 to the erase or reset input of integrator 4', while the voltage commencement pulses at inputs $1'_{b1}$, $1'_{b2}$ and $1'_{b3}$ are connected via an OR gate 5' to the erase or reset input of integrator 4.

The integrator output signal for each measuring integration is composed of a zero phase, an integration phase and a memory phase. Only the memory phase contains the required information. Combination of the two integrator outputs in a member 6 with maximum value selection predominantly reproduces the memory phases. The output voltages $U_4$ and $U'_4$ from integrators 4 and 4' are shown in FIGS. 2d and 2e and the output voltage $U_6$ from member 6 is shown in FIG. 2f.

To satisfy the requirement for an output voltage that is independent of asymmetries and harmonic distortions in the three-phase mains voltage, only the smallest one of the n time intervals, or cutoff angles of each three-phase cycle, or of a complete signal period, is reproduced.

For this purpose, the illustrated measuring value converter contains, according to the invention, $n = 6$ sample and hold members $7_1$, $7_2$, $7_3$, $7'_1$, $7'_2$ and $7'_3$ each of which acts to store the voltage proportional to a corresponding cutoff angle.

These members are controlled by respective voltage commencement pulses. Thus, member $7_1$ is controlled by voltage commencement pulses at input $1_{b1}$ to receive and store the integrator output voltage $U_6$ present at the output of member 6 at the instant of each such voltage commencement pulse, which corresponds to the end of integration of a respective output pulse from stage $2_1$. The same operating sequence occurs for each of the other members 7. Each member 7 stores a respective integrator output voltage value for one complete mains phase period $T = 2\pi$ and then receives a new value resulting from integration of the next succeeding pulse from its associated bistable stage 2.

The inputs of all members 7 are connected together to the output of member 6 so that their common input signal is the signal $U_6$ which is obtained by taking at each instant the maximum of voltages $U_4$ and $U'_4$.

A member 9 is connected to the outputs of all members 7 and produces at its output a voltage $U_9$ representing the smallest of its input voltages.

FIG. 2g shows the voltages $U'_{73}$ and $U'_{72}$ appearing at the output of sample and hold members $7'_3$ and $7'_2$, while FIG. 2h shows the voltage $U_{72}$ at the output of sample and hold member $7_2$. FIG. 2i shows the resulting minimum value signal $U_9$ at the output of minimum value selecting member 9. The minimum signal $U_9$ is derived from the lowest voltage currently being stored in members 7, this value being equal during various periods to $U_{72}$, $U'_{72}$ or $U'_{73}$.

The thus formed minimum value $U_9$, when in the stationary state, is free of harmonics even if there is great asymmetry in the three-phase mains voltages. A decrease in one of the cutoff angles is reproduced at once in voltage $U_9$ if it is less than the previous smallest value.

An increase, however, is reproduced without delay only if it relates to the currently smallest cutoff angle.

An increase in all cutoff angles is reproduced only after a full mains phase period, $2\pi$.

It will be understood that the above description of the present invention is susceptible to various modifications, changes and adaptations, and the same are intended to be comprehended within the meaning and range of equivalents of the appended claims.

What is claimed is:

1. In a method for monitoring the conduction cutoff phase angles of a plurality of current rectifier elements of a rectifier bridge circuit constituted by two groups of such elements, by forming, in an integrator for each group, a signal proportional in amplitude to the most recent cutoff phase angle for that group, determined by the time between the end of current conduction and the beginning of a positive blocking voltage of a respective element of that group, by erasing the integration value provided by each integrator at the beginning of a positive blocking voltage at an element of the respective other group, and by selecting the maximum value of the integrator outputs at each instant, the improvement comprising: storing the maximum integrator output associated with the cutoff phase angle of each element in a respective one of a plurality of sample and hold members by enabling each such member at the beginning of each positive blocking voltage of its associated element; and providing an indication of the minimum one of the values currently stored in all of the sample and hold members.

2. Apparatus for monitoring the conduction cutoff phase angles of a plurality of current rectifier elements connected in two respective groups to form a rectifier bridge circuit, each phase angle for each element corresponding to the period between the end of current conduction therethrough and the subsequent beginning of a positive blocking voltage therefor, comprising:
   a plurality of bistable stages each associated with a respective rectifier element and each connected to be set in response to the end of current conduction through its associated element and to be reset in response to the beginning of a positive blocking voltage across its associated element, thereby producing an output pulse during the time it is set;
   two integrators each connected to receive the output pulses from said stages associated with a respective group of said elements and to produce an output signal proportional to the duration of each such output pulse, each said integrator being further connected to have its present output signal erased upon occurrence of the beginning of a positive blocking voltage for one said element of the respective other group;

maximum value selecting means connected to the outputs of said integrators for producing a maximum value output signal representative of the larger of the output signals presently being produced by said integrators;

a plurality of sample and hold members each associated with a respective rectifier element and each having a signal input connected to receive the maximum value output signal and a control input connected to respond to the instant of the beginning of a positive blocking voltage for its associated rectifier element for causing the then occurring maximum value output signal to be stored; and minimum value selection means connected to all of said sample and hold members for providing a minimum value output signal proportional to the smallest of the signals presently being stored in said members.

3. Apparatus as defined in claim 2 wherein said maximum value selecting means comprises a comparator having comparison inputs connected to the outputs of said integrators.

* * * * *